(12) United States Patent
Kang et al.

(10) Patent No.: US 12,384,274 B2
(45) Date of Patent: Aug. 12, 2025

(54) LOW-COST BALANCING CONTROL FOR DISTRIBUTED LOW VOLTAGE SYSTEM WITH BI-DIRECTIONAL CONVERTERS TO SUPPORT MULTIPLE LOW VOLTAGE BUSSES

(71) Applicant: GM Global Technology Operations LLC, Detroit, MI (US)

(72) Inventors: Jun-mo Kang, Ann Arbor, MI (US); Lyall Kenneth Winger, Waterloo (CA); Dave Gerard Rich, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 49 days.

(21) Appl. No.: 18/515,962

(22) Filed: Nov. 21, 2023

(65) Prior Publication Data
US 2025/0162447 A1   May 22, 2025

(51) Int. Cl.
*B60L 58/12* (2019.01)
*H02J 7/00* (2006.01)

(52) U.S. Cl.
CPC ............ *B60L 58/12* (2019.02); *H02J 7/0013* (2013.01); *H02J 7/0068* (2013.01); *B60L 2240/547* (2013.01)

(58) Field of Classification Search
CPC .. B60L 58/12; B60L 2240/547; H02J 7/0013; H02J 7/0068
See application file for complete search history.

(56) References Cited

U.S. PATENT DOCUMENTS

| | | | |
|---|---|---|---|
| 12,244,148 B2 | 3/2025 | Ahmed et al. | |
| 2020/0235588 A1* | 7/2020 | Lee | H01M 10/425 |
| 2022/0052543 A1* | 2/2022 | Saito | H01M 10/425 |
| 2024/0042895 A1* | 2/2024 | Kang | B60L 58/24 |
| 2024/0100991 A1* | 3/2024 | Bloom | B60L 58/16 |

\* cited by examiner

*Primary Examiner* — Rexford N Barnie
*Assistant Examiner* — Duc M Pham
(74) *Attorney, Agent, or Firm* — CANTOR COLBURN LLP

(57) ABSTRACT

A vehicle includes an electrical system for balancing a state of charge in a battery pack. The electrical system includes a plurality of module groups. A switch array includes a plurality of switches. Each switch is coupled to a respective module group. The switch can be in one of a first state that connects the module group to a first low voltage bus, a second state that connects the module group to a second low voltage bus, and a third state in which the module group is disconnected from both the first low voltage bus and the second low voltage bus. The array is placed in a first phase of a mode of operation with at least one switch in one of the first state and the second state and cycles through the phases of the mode to balance a charge between the plurality of module groups.

20 Claims, 6 Drawing Sheets

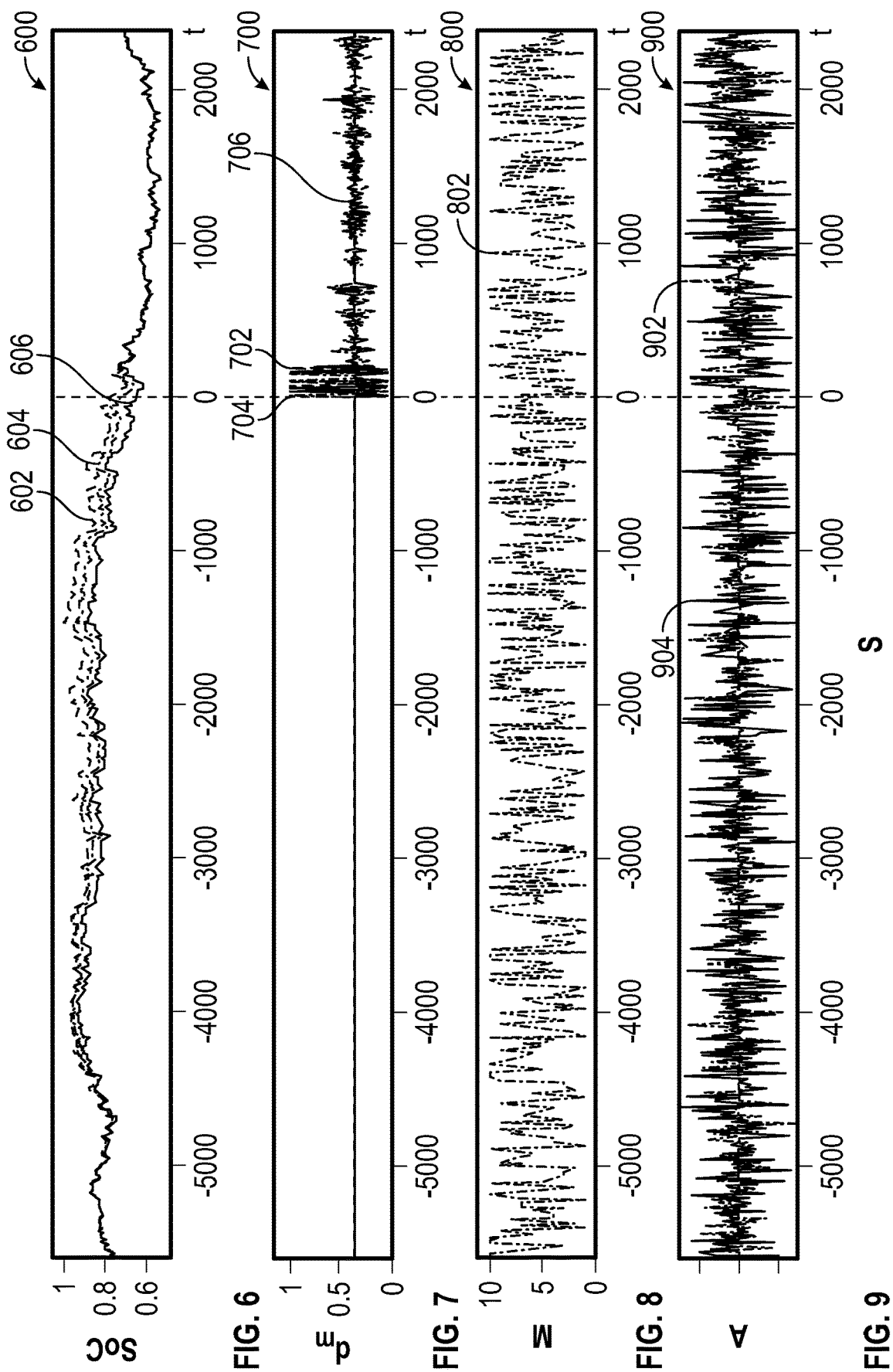

LOW-COST BALANCING CONTROL FOR DISTRIBUTED LOW VOLTAGE SYSTEM WITH BI-DIRECTIONAL CONVERTERS TO SUPPORT MULTIPLE LOW VOLTAGE BUSSES

INTRODUCTION

The subject disclosure relates to an electrical system in a vehicle and, in particular, to a system and method for balancing the state of charge between battery modules of a battery pack of the vehicle by controlling a configuration of switches between the battery pack and one or more low voltage loads of the vehicle.

An electric vehicle operates using an electric system having a battery pack. The battery pack includes a plurality of module groups, each module group having a plurality of battery modules. The battery pack provides power both to high voltage loads, such as the motor, etc. and low voltage loads, such as radio, dashboard, etc. During operation, the state of charge of each module group can vary, causing divergence between the states of charge across the module groups of the battery pack. As the states of charge diverge, the operation of the electric system declines. Accordingly, it is desirable to provide a system and method for balancing the states of charge across the plurality of module groups.

SUMMARY

In one exemplary embodiment, a method of balancing a state of charge between module groups of a battery pack of a vehicle is disclosed. For each module group, the module group is connected to a respective switch of a switch array, wherein the respective switch is configured to be in one of a first state in which the module group is connected to a first low voltage bus, a second state in which the module group is connected to a second low voltage bus, and a third state in which the module group is disconnected from both the first low voltage bus and the second low voltage bus. The switch array is placed in a configuration with at least one switch in one of the first state and the second state, wherein the configuration defines a first phase of a mode of operation of the switch array. The mode is cycled through to balance the state of charge between the module groups.

In addition to one or more of the features described herein, the method further includes adjusting duration of a phase of the mode to passively balance the state of charge between the module groups.

In addition to one or more of the features described herein, the method further includes changing the mode of operation of the switch array.

In addition to one or more of the features described herein, a module group includes a plurality of battery modules, further including connecting each battery module of the module group to the respective switch via a unidirectional direct current (DC/DC) converter.

In addition to one or more of the features described herein, wherein cycling through the mode further includes performing a cyclic permutation of the configurations of the switch array.

In addition to one or more of the features described herein, the respective switch is one of a single switch and a switch pair including a first switch for controlling the connection to the first low voltage bus and a second switch for controlling the connection to the second low voltage bus.

In addition to one or more of the features described herein, wherein the module groups include at least three module groups.

In another exemplary embodiment, an electrical system for a vehicle is disclosed. The electrical system includes a plurality of module groups, a switch array and a processor. The switch array includes a plurality of switches, each switch coupled to a module group from the plurality of module groups and configured to be in one of a first state that connects the module group to a first low voltage bus, a second state that connects the module group to a second low voltage bus, and a third state in which the module group is disconnected from both the first low voltage bus and the second low voltage bus. The processor is configured to place the switch array in a configuration with at least one switch in one of the first state and the second state, wherein the configuration defines a first phase of a mode of operation of the switch array, and cycle through the mode to balance a state of charge between the plurality of module groups.

In addition to one or more of the features described herein, the processor is further configured to adjust a duration of a phase of the mode to passively balance the state of charge between the module groups.

In addition to one or more of the features described herein, the processor is further configured to change the mode of operation of the switch array.

In addition to one or more of the features described herein, a module group includes a plurality of battery modules, each battery module of the module group connected to the respective switch via a unidirectional direct current (DC/DC) converter.

In addition to one or more of the features described herein, the processor is further configured to cycle through the mode by performing a cyclic permutation of the configurations of the switch array.

In addition to one or more of the features described herein, the respective switch is one of a single switch and a switch pair including a first switch for controlling the connection to the first low voltage bus and a second switch for controlling the connection to the second low voltage bus.

In addition to one or more of the features described herein, the plurality of module groups includes at least three module groups.

In yet another exemplary embodiment, a vehicle is disclosed. The vehicle includes a plurality of module groups, a switch array, and a processor. The switch array includes a plurality of switches, each switch coupled to a module group from the plurality of module groups and configured to be in one of a first state that connects the module group to a first low voltage bus, a second state that connects the module group to a second low voltage bus, and a third state in which the module group is disconnected from both the first low voltage bus and the second low voltage bus. The processor is configured to place the switch array in a configuration with at least one switch in one of the first state and the second state, wherein the configuration defines a first phase of a mode of operation of the switch array and cycle through the mode to balance a state of charge between the plurality of module groups.

In addition to one or more of the features described herein, the processor is further configured to adjust a duration of a phase to phase of the mode to passively balance the state of charge between the module groups.

In addition to one or more of the features described herein, the processor is further configured to change the mode of operation of the switch array.

In addition to one or more of the features described herein, a module group includes a plurality of battery modules, each battery module of the module group connected to the respective switch via a unidirectional direct current (DC/DC) converter.

In addition to one or more of the features described herein, the processor is further configured to cycle through the mode by performing a cyclic permutation of the configurations of the switch array.

In addition to one or more of the features described herein, the respective switch is one of a single switch and a switch pair including a first switch for controlling the connection to the first low voltage bus and a second switch for controlling the connection to the second low voltage bus.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 6 is a graph of state of charge against time;

FIG. 7 is a graph of phase duration over time;

FIG. 8 is graph of mode number over time; and

FIG. 9 is graph of bus current over time.

DETAILED DESCRIPTION

Figure 1:
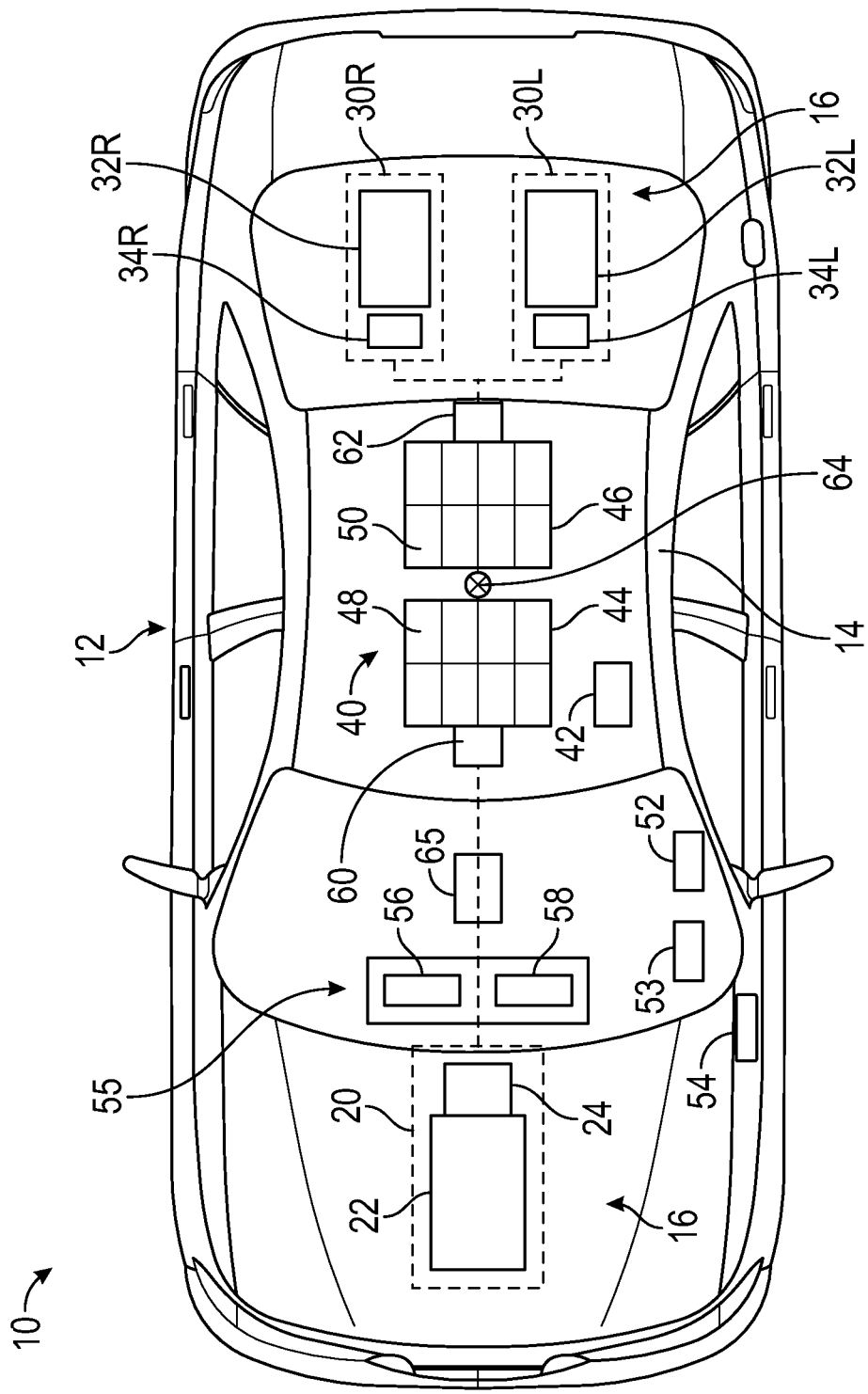
FIG. 1 shows a vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows an embodiment of a vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, and others.

The vehicle 10 may be an electrically powered vehicle (EV), a hybrid vehicle or any other vehicle. In an embodiment, the vehicle 10 is an electric vehicle that includes multiple motors and/or drive systems. The vehicle 10 can be a car, a truck, a van, a bus, a motorcycle, or other type of automobile. Any number of drive units may be included, such as one or more drive units for applying torque to front wheels (not shown) and/or to rear wheels (not shown). The drive units are controllable to operate the vehicle 10 in various operating modes, such as a normal mode, a high-performance mode (in which additional torque is applied), all-wheel drive ("AWD"), front-wheel drive ("FWD"), rear-wheel drive ("RWD") and others.

For example, the propulsion system 16 is a multi-drive system that includes a front drive unit 20 for driving front wheels, and rear drive units for driving rear wheels. The front drive unit 20 includes a front electric motor 22 and a front inverter 24 (e.g., front power inverter module or FPIM), as well as other components such as a cooling system. A left rear drive unit 30L includes a left rear electric motor 32L and a left rear inverter 34L. A right rear drive unit 30R includes a right rear electric motor 32R and a right rear inverter 34R. The front inverter 24, left rear inverter 34L and right rear inverter 34R (e.g., power inverter units or PIMs) each convert direct current (DC) power from a high voltage (HV) battery system 40 to poly-phase (e.g., two-phase, three-phase, six-phase, etc.) alternating current (AC) power to drive the front electric motor 22 the left rear electric motor 32L and the right rear electric motor 32R.

As shown in FIG. 1, the drive systems feature separate electric motors. However, embodiments are not so limited. For example, instead of separate motors, multiple drives can be provided by a single machine that has multiple sets of windings that are physically independent.

As also shown in FIG. 1, the drive systems are configured such that the front electric motor 22 drives the front wheels (not shown), and the left rear electric motor 32L and right rear electric motor 32R drive the rear wheels (not shown). However, embodiments are not so limited, as there may be any number of drive systems and/or motors at various locations (e.g., a motor driving each wheel, twin motors per axle, etc.). In addition, embodiments are not limited to a dual drive system, as embodiments can be used with a vehicle having any number of motors and/or power inverters.

In the propulsion system 16, the front drive unit 20, left rear drive unit 30L and right rear drive unit 30R are electrically connected to the battery system 40. The battery system 40 may also be electrically connected to other electrical components (also referred to as "electrical loads"), such as vehicle electronics (e.g., via an auxiliary power module or APM 42), heaters, cooling systems and others. The battery system 40 may be configured as a rechargeable energy storage system (RESS).

In an embodiment, the battery system 40 includes a plurality of separate battery assemblies, in which each battery assembly can be independently charged and can be used to independently supply power to a drive system or systems. For example, the battery system 40 includes a first battery assembly such as a first battery pack 44 connected to the front inverter 24, and a second battery pack 46. The first battery pack 44 includes a plurality of battery modules 48, and the second battery pack 46 includes a plurality of battery modules 50. Each battery module 48, 50 includes a number of individual cells (not shown).

Each of the front electric motor 22 and the left rear electric motor 32L and right rear electric motor 32R is a three-phase motor having three phase motor windings. However, embodiments described herein are not so limited. For example, the motors may be any poly-phase machines supplied by poly-phase inverters, and the drive units can be realized using a single machine having independent sets of windings.

The battery system 40 and/or the propulsion system 16 includes a switching system having various switching devices for controlling operation of the first battery pack 44 and second battery pack 46, and selectively connecting the first battery pack 44 and second battery pack 46 to the front drive unit 20, left rear drive unit 30L and right rear drive unit 30R. The switching devices may also be operated to selectively connect the first battery pack 44 and the second battery pack 46 to a charging system. The charging system can be used to charge the first battery pack 44 and the second battery pack 46, and/or to supply power from the first battery pack 44 and/or the second battery pack 46 to charge another energy storage system (e.g., vehicle-to-vehicle (V2V) and/or vehicle-to-everything (V2X) charging). The charging system includes one or more charging modules. For example, a first onboard charging module (OBCM) 52 is electrically connected to a charge port 54 for charging to and from an AC system or device, such as a utility AC power supply. A second OBCM 53 may be included for DC charging (e.g., DC fast charging or DCFC).

In an embodiment, the switching system includes a first switching device 60 that selectively connects to the first battery pack 44 to the front inverter 24, left rear inverter 34L and right rear inverter 34R, and a second switching device 62 that selectively connects the second battery pack 46 to the front inverter 24, left rear inverter 34L and right rear inverter 34R. The switching system also includes a third switching device 64 (also referred to as a "battery switching device") for selectively connecting the first battery pack 44 to the second battery pack 46 in series.

Any of various controllers can be used to control functions of the electrical system of the vehicle, including the battery system 40, the switching system the drive units, etc. A controller 65 includes any suitable processing device or unit and may use an existing controller such as a drive system controller, an RESS controller, and/or controllers in the drive system. For example, a controller 65 may be included for controlling switching and drive control operations as discussed herein.

The controller 65 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 65 may include a non-transitory computer-readable medium that stores instructions which, when processed by one or more processors of the controller 65, implement a method of balancing charge across various battery modules of the vehicle during operation of low voltage loads, according to one or more embodiments detailed herein.

The vehicle 10 also includes a computer system 55 that includes one or more processing devices 56 and a user interface 58. The computer system 55 may communicate with the charging system controller, for example, to provide commands thereto in response to a user input. The various processing devices, modules and units may communicate with one another via a communication device or system, such as a controller area network (CAN) or transmission control protocol (TCP) bus.

As illustrated herein, the vehicle 10 is an electric vehicle. In an alternative embodiment, the vehicle 10 can be an internal combustion engine vehicle fueled by gasoline, diesel, etc., a hybrid vehicle partially or wholly powered by electrical power, etc.

As described herein, a vehicle can include one or more electrical loads that are powered by one or more batteries. Exemplary loads include, but are not limited to, motors, lights, infotainment equipment, electronic control units, climate control systems, etc. The electrical loads can be high voltage load or low voltage loads, and the battery system 40 (e.g., one or more of the first battery pack 44 and the second battery pack 46) can provide both high voltage to the high voltage loads and low voltage to the low voltage loads. According to one or more embodiments described herein, a high voltage can refer to, but is not limited to, 100 volts, 250 volts, 400 volts, 500 volts, 650 volts, 800 volts, 1000 volts, etc. The low voltage can refer to, but is not limited to, 12 V, 48V etc. To support these low voltage loads, the vehicle 10 can include at least one DC/DC converter to convert DC electric power from the higher voltage to the lower voltage, as disclosed herein.

Figure 2:
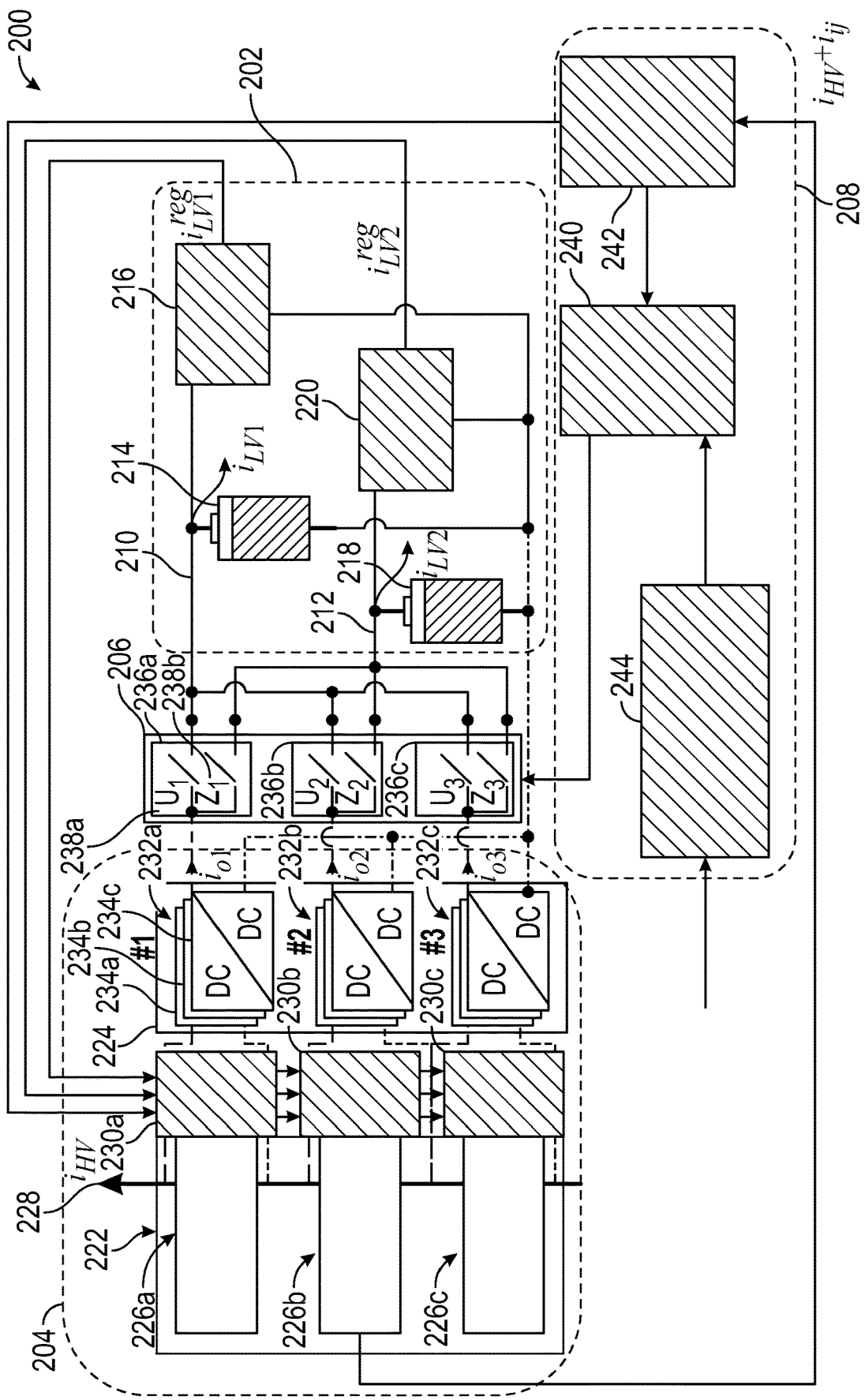
FIG. 2 shows a circuit diagram for an electrical system of the vehicle, in an illustrative embodiment.

FIG. 2 shows a circuit diagram for an electrical system 200 of the vehicle 10, in an illustrative embodiment. The electrical system 200 includes a grid system 202, a power circuit 204, a switch array 206, and a control circuit 208. The grid system 202 includes various low voltage loads of the vehicle 10. The power circuit 204 includes various electrical elements for providing power to the low voltage loads. The switch array 206 include switches that control connections between the electrical elements of the power circuit 204 and the low voltage loads of the grid system 202. The switch array 206 also can be used to balance charge between the electrical elements of the power circuit 204, as disclosed herein. The control circuit 208 can be a processor operating one or more algorithms for controlling operation of the electrical elements of the switch array 206.

For illustrative purposes, the grid system 202 includes a first low voltage grid 210 and a second low voltage grid 212. In other embodiments, more than two voltage grids can be included in the grid system 202. The first low voltage grid 210 includes a first low voltage load 214 and a first load regulator 216. The second low voltage grid 212 includes a second low voltage load 218 and a second load regulator 220.

The power circuit 204 includes a battery pack 222 and a DC converter array 224. The battery pack 222 includes a plurality of module groups 226a, 226b, 226c. Each module group 226a, 226b, 226c includes a plurality of battery modules. For illustrative purposes, a first module group 226a, a second module group 226b, and a third module group 226c are shown. However, it is understood that any plural number of module groups can be included in the battery pack 222 in various embodiments. The module groups 226a, 226b, 226c are wired in series with each other along a high voltage bus 228. Each module group 226a, 226b, 226c includes an associated module balancing controller 230a, 230b, 230c. Each module balancing controller (e.g., module balancing controller 230a) is used to balance state of charge (SOC) between the battery modules of the associated module group (e.g., module group 226a). The module balancing controllers 230a, 230b, 230c can receive feedback signals indicative of a first load regulator current ($i^{reg}_{LV1}$), a second load regulator current ($i^{reg}_{LV2}$) and an estimation of state of charge.

The DC converter array 224 includes DC converter groups 232a, 232b, 232c. Each DC converter groups is associated with a respective module group. (e.g., first DC converter group 232a is associated with first module group 226a). Each DC converter group includes a plurality of DC/DC converters (such as DC converters 234a, 234b, 234c), wherein a primary end of each DC/DC converter is coupled to a respective module of the associated module group (e.g., module group 226a). Each DC/DC converter is a unidirectional converter.

The switch array 206 includes a plurality of switch groups 236a, 236b, 236c. Each switch group is associated with a respective DC converter group. For example, switch group 236a is connected to a secondary side of the DC converter group 232a. A switch group can include multiple switches. For example, the first switch group 236a includes a first switch 238a ($U_1$) and a second switch 238b ($Z_1$). The first switch $U_1$ controls a connection between the first DC converter group 226a and the first low voltage grid 210. The second switch $Z_1$ controls a connection between the first DC converter group 226a and the second low voltage grid 212.

The first switch $U_1$ and the second switch $Z_1$ can be placed in several configurations. In a first configuration, the first switch $U_1$ is in an ON state and the second switch $Z_1$ is in an OFF state, thereby connecting the first module group to the first low voltage grid 210, with the second low voltage grid 212 disconnected from the first module group. In a second configuration, the first switch $U_1$ is in an OFF state and the second switch $Z_1$ is in an ON state, thereby connecting the first module group 226a to the second low voltage grid 212, with the first low voltage grid 210 disconnected from the first module group. In a third configuration, the first switch $U_1$ and the second switch Z are both in an OFF state, thereby disconnecting the first module group 226a from both the first low voltage grid 210 and the second low voltage grid 212. The first switch $U_1$ and the second switch $Z_1$ cannot both be in an ON state when a balancing controller algorithm disclosed herein is enabled. Similar configurations are available for the switches $U_2$ and $Z_2$ of the second switch group 236b and switches $U_3$ and $Z_3$ of the third switch group 236c.

The control circuit 208 operates a state of charge balancing control algorithm 240, a state of charge estimation algorithm 242, and a mode determination algorithm 244. The state of charge balancing algorithm-240 controls configuration of the switches of the switch array 206 (i.e., switches of the first switch group 236a, second switch group 236b and third switch group 236c).

The state of charge estimation algorithm 242 receives data from sensors that can measure current, voltage and temperature at the module groups or at individual battery modules within a module group. The state of charge estimation algorithm 242 can supply state of charge values to a module balancing controller of a selected module group (i.e., module balancing controller 230a of the first module group 226a) which performs actions to balance charge between the battery modules of the selected module group. The state of charge estimation algorithm 242 can also supply state of charge values to the charge balancing control algorithm 240, which controls the configuration of the switch array 206 based on the state of charge values.

The mode determination algorithm 240 receives input about the demands of the low voltage loads and outputs a mode of operation and a mode duration that can be used at the charge balancing algorithm 240 to control the configuration of the switch array 206. Further discussion of the mode of operation and mode duration is described herein with respect to FIG. 3 and Table 1.

Figure 3:
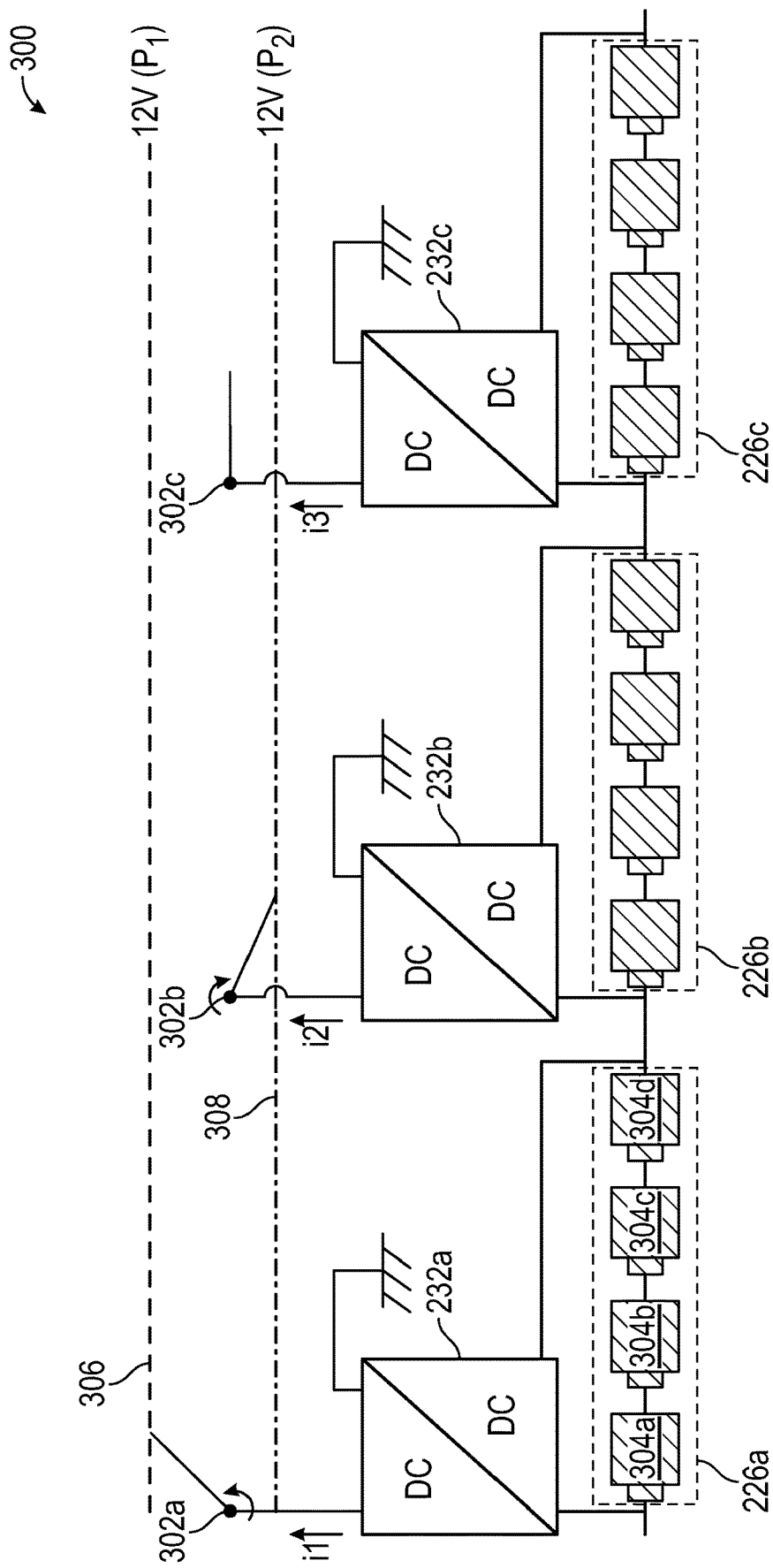
FIG. 3 shows a high-level schematic diagram of a power circuit of the electrical system.

FIG. 3 shows a high-level schematic diagram 300 of the power circuit 204 of FIG. 2. The high-level schematic diagram 300 shows the module groups 226a, 226b, 226c, associated DC converter groups 232a, 232b, 232c, and associated switches 302a, 302b, 302c (equivalent representations of the switch groups 236a, 236b, 236c of FIG. 2). Four battery modules 304a, 304b, 304c, 304d of the first module group 226a are shown for illustrative purposes. In various embodiments, any number of modules can be included in a module group. The switch groups 236a, 236b, 236c are each depicted as a single switch having the ability either to connect to a first low voltage bus 306 associated with the first low voltage grid 210, to connect to a second low voltage bus 308 associated with the second low voltage grid 212, or to be in a neutral or OFF state. For purpose of illustration, the first switch 302a is depicted as being connected to the first low voltage bus 306 and is therefore in a state referred to as a $P_1$ state. The second switch 302b is depicted as being connected to the second low voltage bus 308 and is therefore in a state referred to as a $P_2$ state. The third switch 302c is depicted as being disconnected from both the first low voltage bus 306 and the second low voltage bus 308 and is therefore in a state referred to as an X state. As a unit, the array including the first switch 302a, second switch 302b and third switch 302c is referred to as operating in a $P_1P_2X$ mode.

A switch mode includes various phases that are performed in sequence. Each phase includes the switches in a particular configuration (e.g., $P_1P_2X$). Each phase is related to a previous phase by a cyclic permutation of the states of the switches. For example, the configuration of switches as shown in FIG. 3 (i.e., $P_1P_2X$) defines a first phase of the mode. A second phase thus includes the switches in an $XP_1P_2$ configuration and a third phase includes the switches in a $P_2XP_1$ configuration. Operation of the mode includes cycling from the first phase to the second phase to the third phase and then back to the first phase. The duration of the mode and the duration of the phases can be controlled by the mode determination algorithm 244.

Table 1 shows various modes for the switches and their associated phases. The state of charge balancing control algorithm 240 controls the configuration of the switch array 206 and adjusts durations of each phase to balance the states of charge of the module groups.

TABLE 1

| Mode # | Phase 1 | Phase 2 | Phase 3 |
|---|---|---|---|
| 1 | XXX | XXX | XXX |
| 2 | $XXP_1$ | $P_1XX$ | $XP_1X$ |
| 3 | $XXP_2$ | $P_2XX$ | $XP_2X$ |
| 4 | $XP_1P_1$ | $P_1XP_1$ | $P_1P_1X$ |
| 5 | $XP_2P_2$ | $P_2XP_2$ | $P_2P_2X$ |
| 6 | $XP_1P_2$ | $P_2XP_1$ | $P_1P_2X$ |
| 7 | $P_1P_1P_2$ | $P_2P_1P_1$ | $P_1P_2P_1$ |
| 8 | $P_1P_2P_2$ | $P_2P_1P_2$ | $P_2P_2P_1$ |
| 9 | $P_1P_1P_1$ | $P_1P_1P_1$ | $P_1P_1P_1$ |
| 10 | $P_2P_2P_2$ | $P_2P_2P_2$ | $P_2P_2P_2$ |

Figure 4:
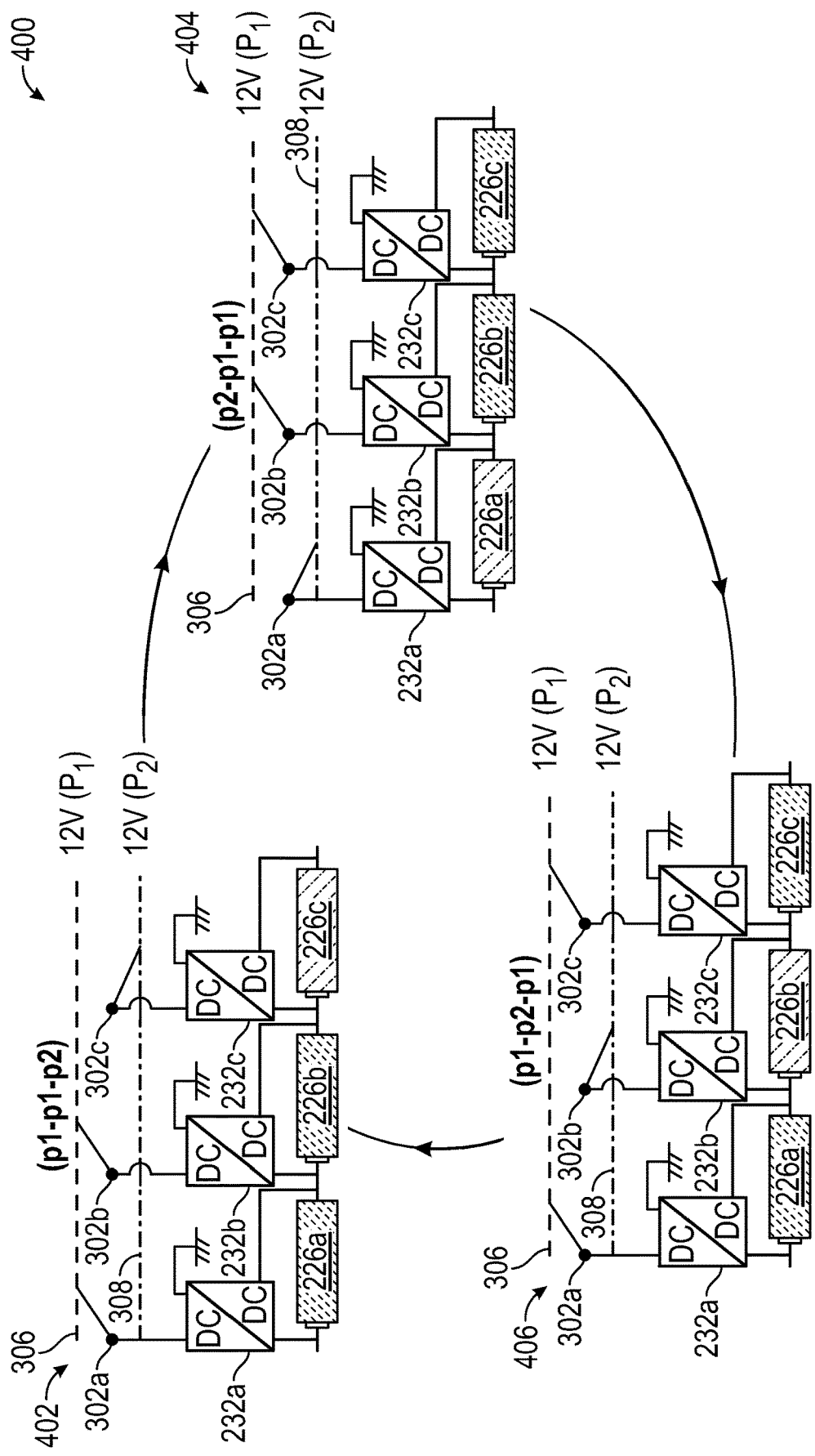
FIG. 4 depicts a cycle through phases of a $P_1P_1P_2$ mode, for illustrative purposes.

FIG. 4 depicts a cycle 400 through phases of a $P_1P_1P_2$ mode, for illustrative purposes. The cycle 400 includes a first phase 402 ($P_1P_1P_2$), a second phase 404 ($P_2P_1P_1$) and a third phase 406 ($P_1P_2P_1$). In the first phase 402, both the first module group 226a and the second module group 226b are connected to the same bus (i.e., the first low voltage bus 306), thereby allowing a charge transfer and thus charge balancing between the first module group and the second module group. Similarly, in the second phase, both the second module group 226b and the third module group 226c are connected to the same bus (i.e., the first low voltage bus 306), thereby allowing a charge transfer and thus charge balancing between the second module group and the third module group. In the third phase, both the third module group 226c and the first module group 226a are connected to the same bus (i.e., the first low voltage bus 306), thereby allowing a charge transfer and thus charge balancing between the third module group and the first module group. Cycling through the $P_1P_1P_2$ mode adjusts a power distribution to the first low voltage bus 306 and the second low voltage bus 308.

Figure 5:
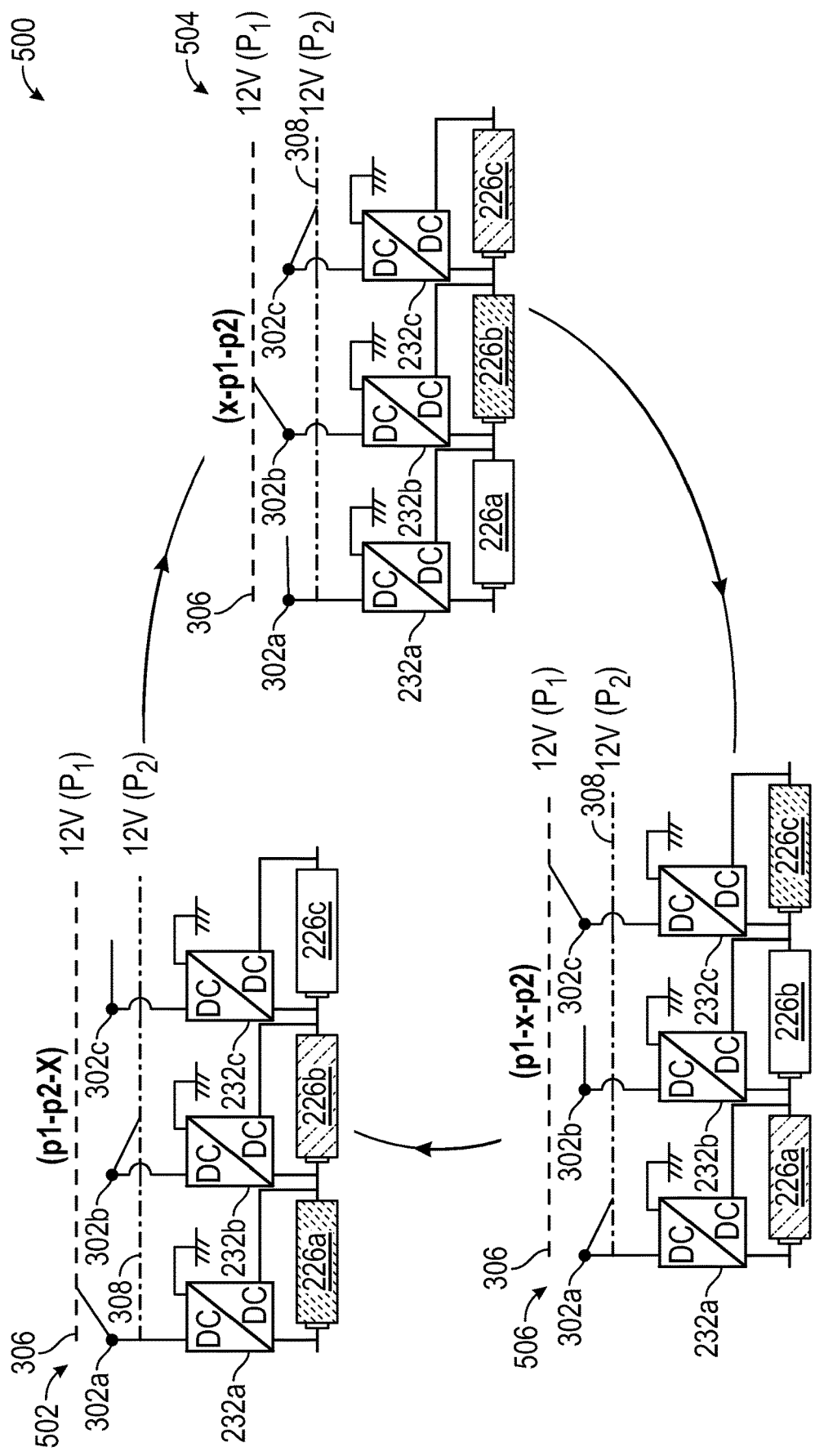
FIG. 5 depicts a cycle through phases of a $P_1P_2X$ mode, for illustrative purposes.

FIG. 5 depicts a cycle 500 through phases of a $P_1P_2X$ mode, for illustrative purposes. The cycle 500 includes a first phase 502 ($P_1P_2X$), a second phase 504 ($XP_1P_2$) and a third phase 506 ($P_2XP_1$). In the first phase 502, the first module group 226a is connected to the first low voltage bus 306 and the second module group 226b is connected to the second low voltage bus 308. The third module group 226c is not connected to either bus. In the second phase, the second module group 226b is connected to the first low voltage bus 306 and the third module group 226c is connected to the second low voltage bus 308. The first module group 226a is not connected to either bus. In the third phase, the third module group 226c is connected to the first low voltage bus 306 and the first module group 226a is connected to the second low voltage bus 308. The second module group 226b is not connected to either bus. Cycling through the $P_1P_2X$ mode provides equal power to the first low voltage bus 306 and the second low voltage bus 308.

FIG. 6 is a graph 600 of state of charge against time. Time is shown along the abscissa in seconds and SOC is shown along the ordinate axis, wherein the value of SOC=1 refers to a fully charged module and SOC=0 is a fully discharged module. The SOCs of the modules are initially balanced (i.e., same SOC at time t=5500 seconds). The modules are operated up until time t=0 with equal phase duration. Over time, the SOCs of the modules diverge, as shown by the divergence between first SOC 602 of the first module group 226a, second SOC 604 of the second module group 226b, and third SOC 606 of the third module group 226c. At time t=0, the change balancing operation disclosed herein is implemented. The first SOC 602, second SOC 604 and third SOC 606 soon converge to a same value (i.e., within about 100 seconds).

FIG. 7 is a graph 700 of phase duration over time. Time is shown along the abscissa in seconds and phase duration is shown as a normalized value along the ordinate axis. From t=−5500 seconds to t=0 seconds, the durations of the phases are the same value (e.g., about 0.4). At time t=0, the duration of the phases are changed to cause balancing between modules, as shown by first phase duration 702, second phase duration 704 and third phase duration 706.

FIG. 8 is graph 800 of mode number over time. Time is shown along the abscissa in seconds and mode number (see column 1 of Table 1) is shown along the ordinate axis. Curve 802 shows the mode number at a given time and indicates the shifting between modes as appropriate.

FIG. 9 is graph 900 of bus current over time. Time is shown along the abscissa in seconds and current is shown along the ordinate axis. Curve 902 shows the current along the first low voltage bus 306 (P1) and curve 904 shows the current along the second low voltage bus 308 (P2).

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of balancing a state of charge between module groups of a battery pack of a vehicle, comprising:
   connecting the module groups in series along a high voltage bus;
   for each module group, connecting the module group to a respective switch of a switch array, wherein the respective switch is configured to be in one of a first state in which the module group is connected to a first low voltage bus, a second state in which the module group is connected to a second low voltage bus, and a third state in which the module group is disconnected from both the first low voltage bus and the second low voltage bus;
   placing the switch array for each module group in a configuration with at least one switch in one of the first state and the second state, wherein the configuration defines a first phase of a mode of operation of the switch array; and
   cycling through the phase of the mode of operation to balance the state of charge between the module groups.

2. The method of claim 1 further comprising adjusting duration of a phase of the mode to passively balance the state of charge between the module groups.

3. The method of claim 1, further comprising changing the mode of operation of the switch array.

4. The method of claim 1, wherein a module group includes a plurality of battery modules, further comprising connecting each battery module of the module group to the respective switch via a unidirectional direct current (DC/DC) converter.

5. The method of claim 1, wherein cycling through the mode further comprising performing a cyclic permutation of the configurations of the switch array.

6. The method of claim 1, wherein the respective switch is one of: (i) a single switch; and (ii) a switch pair including a first switch for controlling the connection to the first low voltage bus and a second switch for controlling the connection to the second low voltage bus.

7. The method of claim 1, wherein the module groups include at least three module groups.

8. An electrical system for a vehicle, comprising:
   a high voltage bus;

a plurality of module groups connected in series along the high voltage bus;

a switch array including a plurality of switches, each switch coupled to a module group from the plurality of module groups and configured to be in one of a first state that connects the module group to a first low voltage bus, a second state that connects the module group to a second low voltage bus, and a third state in which the module group is disconnected from both the first low voltage bus and the second low voltage bus; and a processor configured to:

place the switch array for each module group in a configuration with at least one switch in one of the first state and the second state, wherein the configuration defines a first phase of a mode of operation of the switch array; and cycle through the phases of the mode of operation to balance a state of charge between the plurality of module groups.

9. The electrical system of claim 8, wherein the processor is further configured to adjust a duration of a phase of the mode to passively balance the state of charge between the module groups.

10. The electrical system of claim 8, wherein the processor is further configured to change the mode of operation of the switch array.

11. The electrical system of claim 8, wherein a module group includes a plurality of battery modules, each battery module of the module group connected to the respective switch via a unidirectional direct current (DC/DC) converter.

12. The electrical system of claim 8, wherein the processor is further configured to cycle through the mode by performing a cyclic permutation of the configurations of the switch array.

13. The electrical system of claim 8, wherein the respective switch is one of: (i) a single switch; and (ii) a switch pair including a first switch for controlling the connection to the first low voltage bus and a second switch for controlling the connection to the second low voltage bus.

14. The electrical system of claim 8, wherein the plurality of module groups includes at least three module groups.

15. A vehicle, comprising:

a high voltage bus;

a plurality of module groups connected in series along the high voltage bus;

a switch array including a plurality of switches, each switch coupled to a module group from the plurality of module groups and configured to be in one of a first state that connects the module group to a first low voltage bus, a second state that connects the module group to a second low voltage bus, and a third state in which the module group is disconnected from both the first low voltage bus and the second low voltage bus; and a processor configured to:

place the switch array for each module group in a configuration with at least one switch in one of the first state and the second state, wherein the configuration defines a first phase of a mode of operation of the switch array; and cycle through the phases of the mode of operation to balance a state of charge between the plurality of module groups.

16. The vehicle of claim 15, wherein the processor is further configured to adjust a duration of a phase to phase of the mode to passively balance the state of charge between the module groups.

17. The vehicle of claim 15, wherein the processor is further configured to change the mode of operation of the switch array.

18. The vehicle of claim 15, wherein a module group includes a plurality of battery modules, each battery module of the module group connected to the respective switch via a unidirectional direct current (DC/DC) converter.

19. The vehicle of claim 15, wherein the processor is further configured to cycle through the mode by performing a cyclic permutation of the configurations of the switch array.

20. The vehicle of claim 15, wherein the respective switch is one of: (i) a single switch; and (ii) a switch pair including a first switch for controlling the connection to the first low voltage bus and a second switch for controlling the connection to the second low voltage bus.

* * * * *